Dec. 7, 1954 H. M. HERBENER 2,696,003

GIRDLE

Filed April 25, 1951 5 Sheets-Sheet 1

INVENTOR
HENRY M. HERBENER

BY [signature]

ATTORNEY

GIRDLE

Filed April 25, 1951 5 Sheets-Sheet 2

INVENTOR
HENRY M. HERBENER
BY
ATTORNEY

INVENTOR
HENRY M. HERBENER

BY [signature]

ATTORNEY

GIRDLE

INVENTOR
HENRY M. HERBENER
BY
ATTORNEY

Dec. 7, 1954 H. M. HERBENER 2,696,003

GIRDLE

Filed April 25, 1951 5 Sheets-Sheet 5

INVENTOR
HENRY M. HERBENER

BY [signature]

ATTORNEY

United States Patent Office 2,696,003

Patented Dec. 7, 1954

2,696,003

GIRDLE

Henry M. Herbener, Thomasville, Ga.

Application April 25, 1951, Serial No. 222,868

6 Claims. (Cl. 2—38)

My invention relates to ladies' girdles, corselets or the like.

An object of the invention is to provide a girdle which will produce the maximum of control with the maximum of comfort; will afford complete protection and preserve the ideal body contours; and will have the advantages of a pantie girdle without its disadvantages.

An important object of the invention is to provide a girdle having a circumferential tension which decreases downward from a point near and spaced from the bottom with a minimum circumferential tension at the bottom.

A further object of the invention is to provide means for producing a variable circular tension in an elastic girdle at the same elevation, whereby maximum tension may be applied to the abdomen and a lesser tension applied to the hips and other parts where it would be undesirable.

A further object of the invention is to apply circular tension to the abdomen covering portion of the girdle in a substantially horizontal plane, and also in diagonal directions, whereby the combined tensions produce the variable tensions in the same plane of the girdle.

A further object of the invention is to provide a girdle which will give the maximum freedom of leg movement, thus promoting the comfort and saving the energy of the user.

A further object of the invention is to provide a girdle affording protection combined with greater leg freedom and less interference with leg circulation.

A further object of the invention is to provide a crotch construction which will serve as a cover or shield, is simple in construction and will be much more comfortable than the ordinary pantie girdle.

A further object of the invention is to provide a crotch construction for use in connection with a girdle having a high cut front opening, with or without stiffening ribs secured to the garment near and upon opposite sides of such front opening, such girdle being shown in my Patent 2,315,701.

Figures 1, 2, 3, 4, 5, 5A:
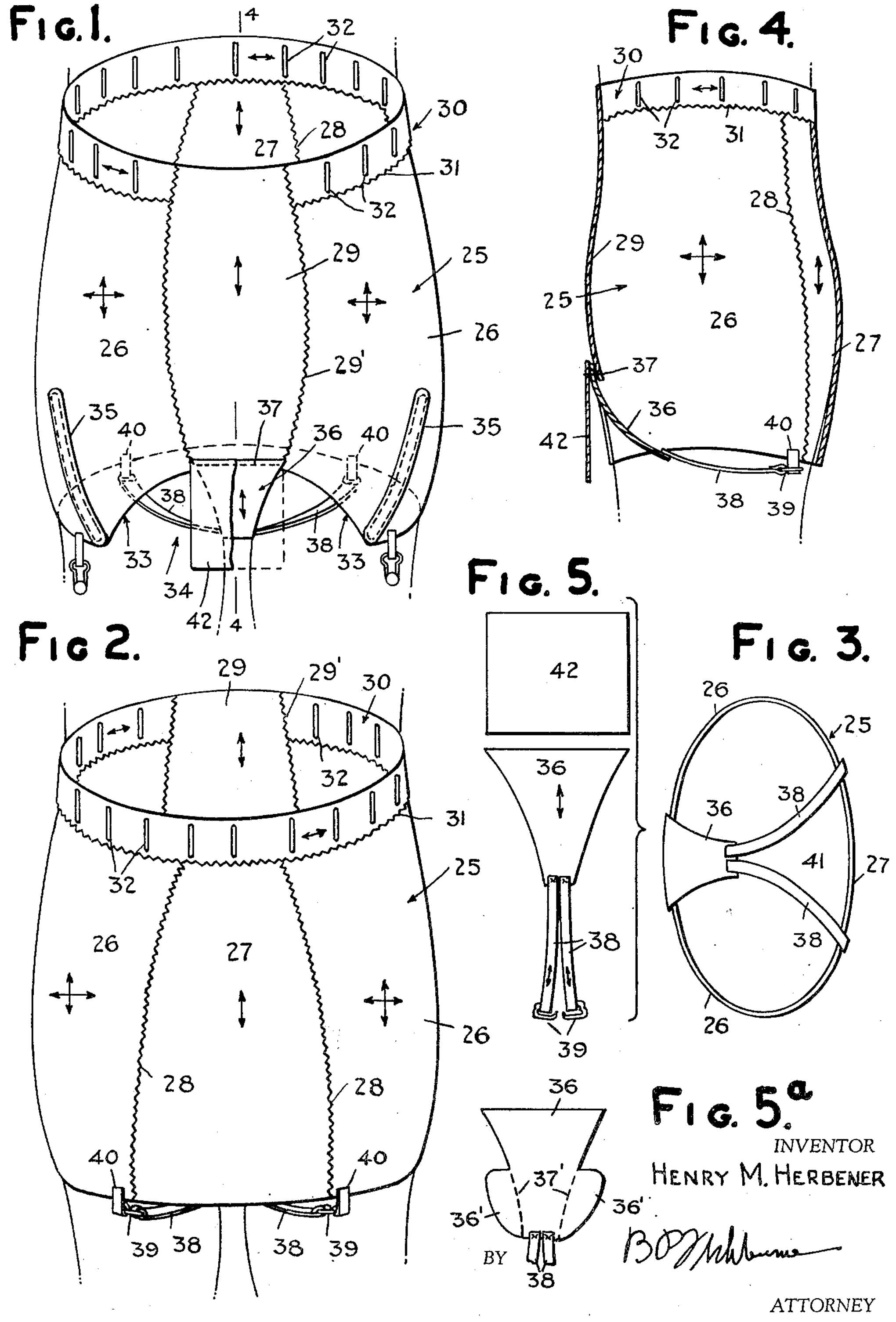
Figures 6, 10:
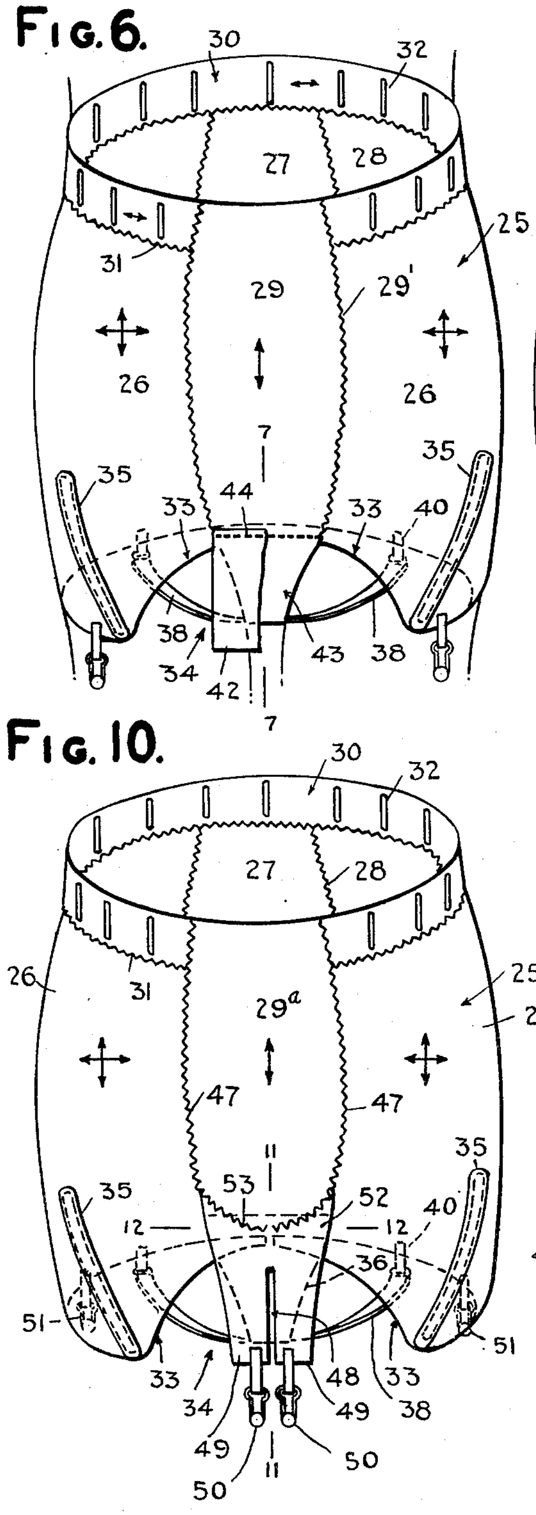
Figure 8:
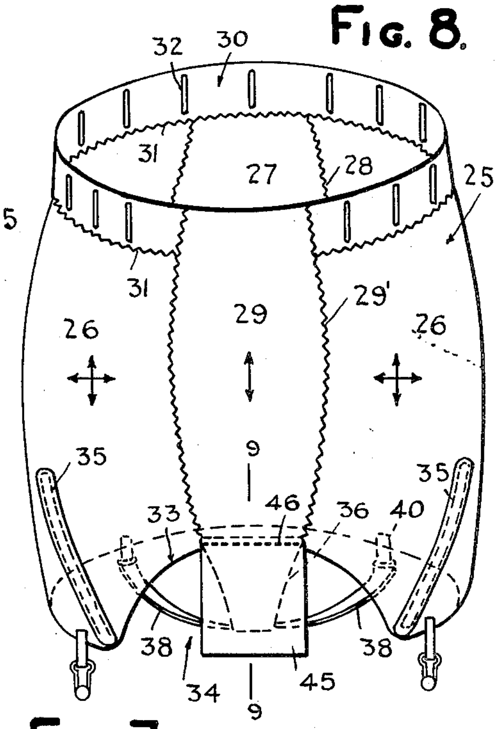
Figure 7:
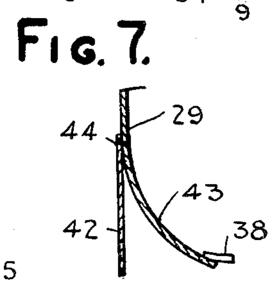
Figure 9:
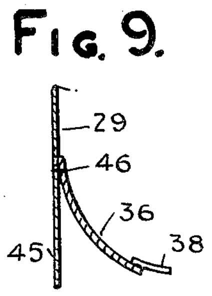
Figure 11:
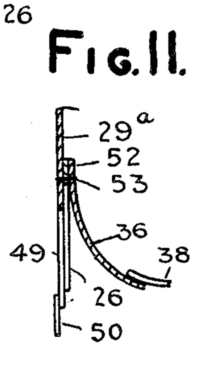
Figure 12:
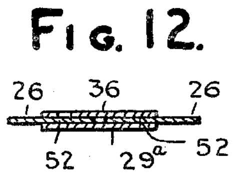
Figure 13:
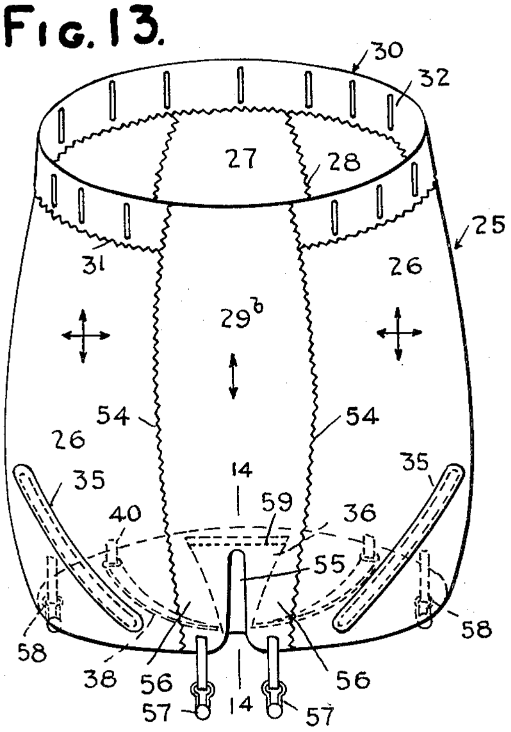
Figure 15:
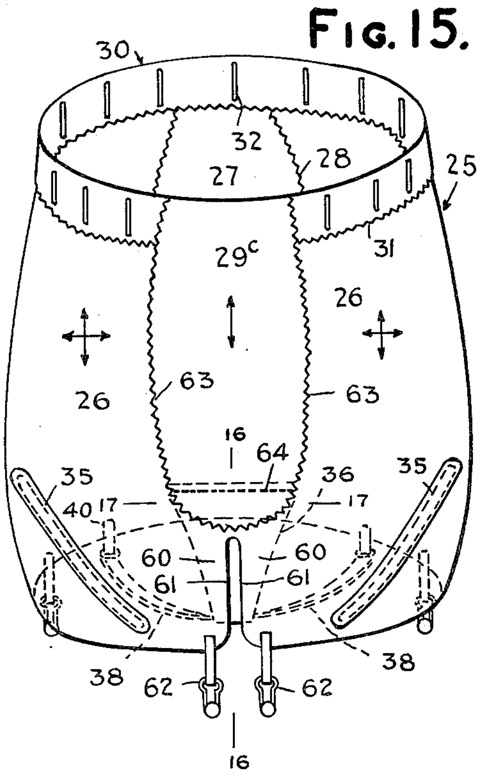
Figure 18:
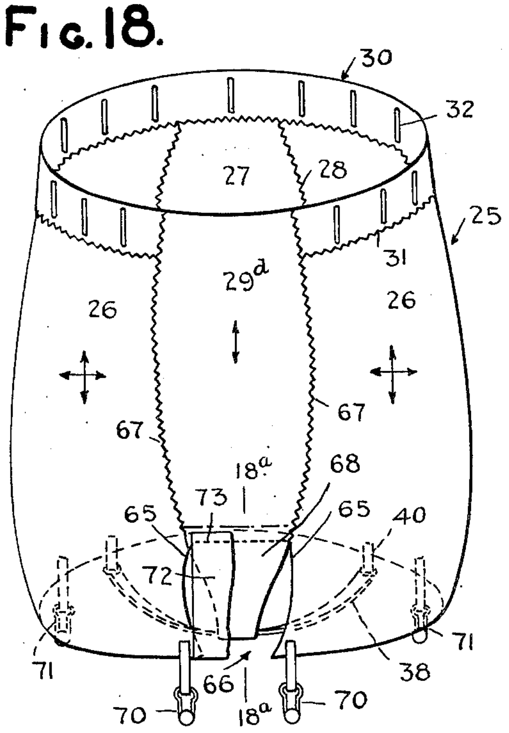
Figure 16:
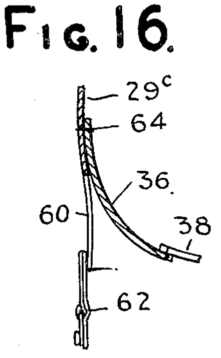
Figure 17:
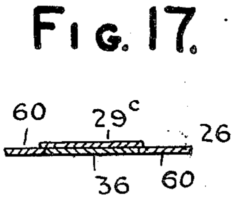
Figure 18A:
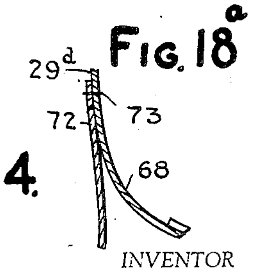
Figure 14:
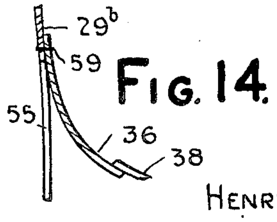
Figure 19A:
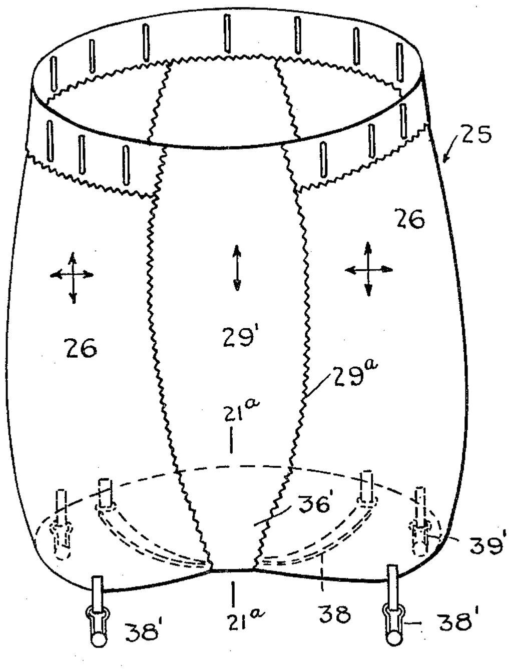
Figures 20A, 21A:
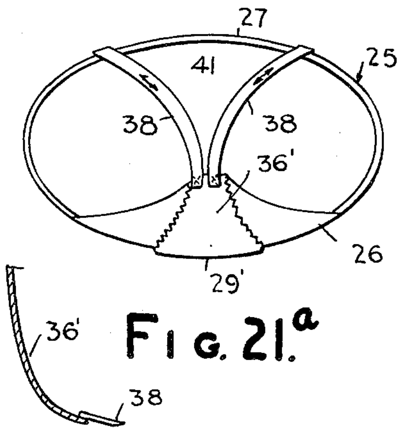
Figure 23:
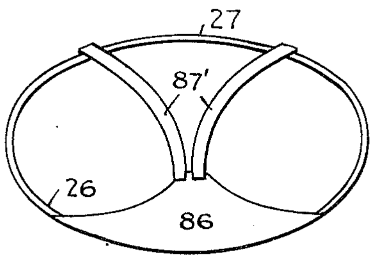
Figure 24:
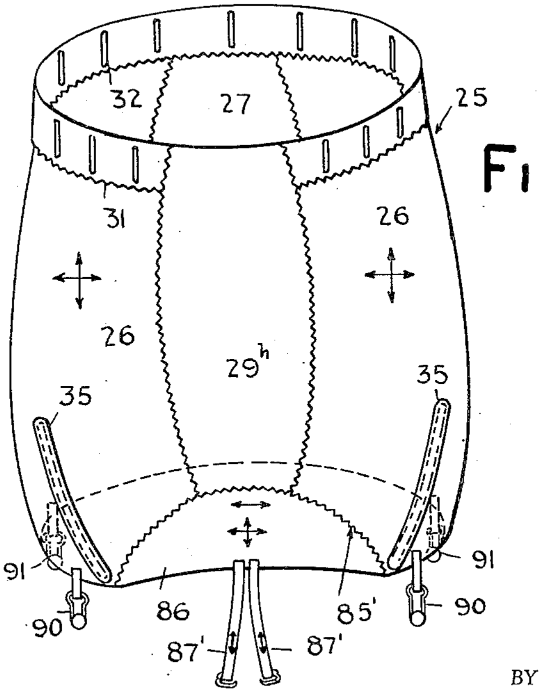
Figure 25:
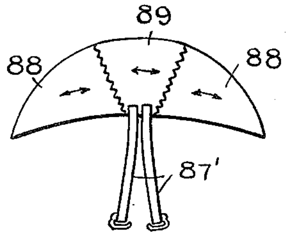
Figure 19:
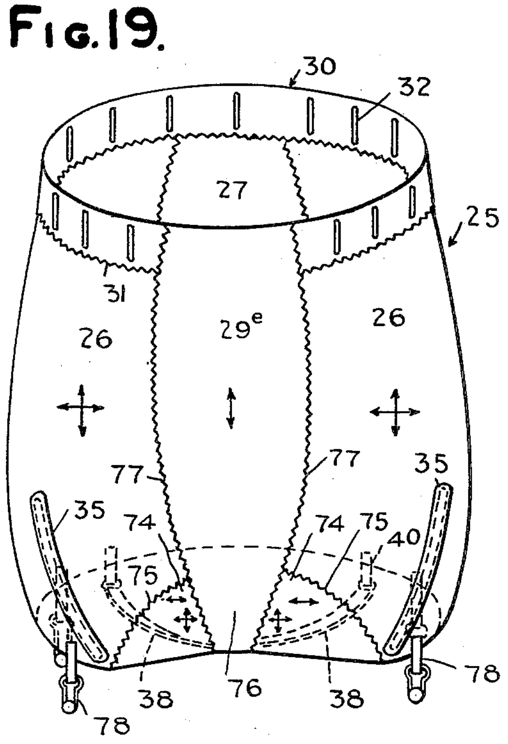
Figure 20:
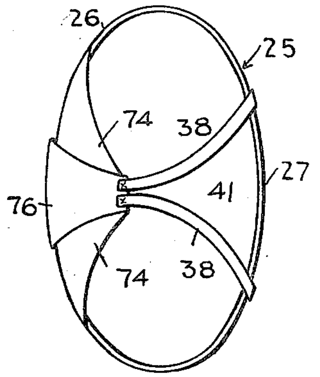
Figure 21:
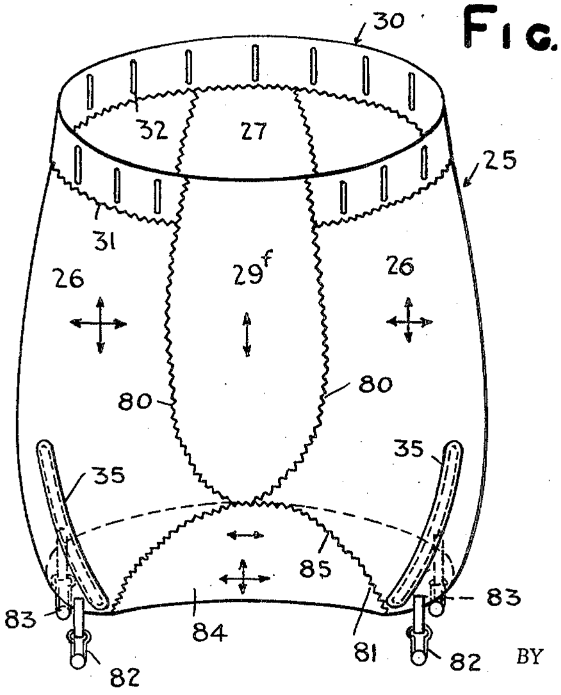
Figure 22:
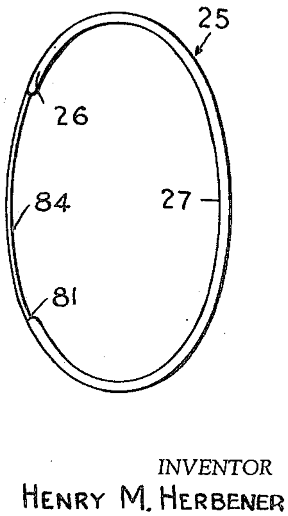

Figure 1 is a front perspective view of a girdle embodying my crotch construction, showing the same in use, Figure 2 is a rear perspective view of the same, Figure 3 is a bottom plan view of the girdle shown in Figure 1, Figure 4 is a vertical section taken on line 4—4 of Figure 1, Figure 5 is a front elevation of the crotch construction and curtain, Figure 5a is a front elevation of a modified form of crotch construction, Figure 6 is a front perspective view of a girdle embodying a second form of the invention, Figure 7 is a vertical section taken on line 7—7 of Figure 6, Figure 8 is a front perspective view of a girdle embodying a third form of the invention, Figure 9 is a vertical section taken on line 9—9 of Figure 8, Figure 10 is a front perspective view of a girdle embodying a fourth form of the invention, Figure 11 is a vertical section taken on line 11—11 of Figure 10, Figure 12 is a horizontal section taken on line 12—12 of Figure 10, Figure 13 is a front perspective view of a girdle embodying a fifth form of the invention, Figure 14 is a vertical section taken on lines 14—14 of Figure 13, Figure 15 is a front perspective view of a girdle embodying a sixth form of the invention, Figure 16 is a vertical section taken on lines 16—16, of Figure 15, Figure 17 is a horizontal section taken on lines 17—17 of Figure 15, Figure 18 is a front perspective view of a girdle embodying a seventh form of the invention, Figure 18a is a vertical section taken on lines 18a—18a of Figure 18, Figure 19 is a front perspective view of a girdle embodying an eighth form of the invention, Figure 20 is a bottom plan view of the same, Figure 19a is a front perspective view of a girdle embodying a ninth form of the invention, Figure 20a is a bottom plan view of the same, Figure 21a is a vertical section taken on lines 21a—21a of Figure 19a, Figure 21 is a front perspective view of a girdle embodying a tenth form of the invention, Figure 22 is a bottom plan view of same, Figure 23 is a front perspective view of a girdle embodying an eleventh form of the invention, Figure 24 is a bottom plan view of same, and Figure 25 is a side elevation of a modified form of front section.

In the first form of the invention, Figures 1 to 5 inclusive, the numeral 25 designates the tubular body portion of a girdle, including side portions 26 formed of elastic fabric, which preferably has a two-way stretch, vertical and horizontal. The numeral 27 designates a back panel secured to the side portions 26 by a zig-zag line of stitching 28. This back panel is formed of an elastic fabric preferably having a vertical or one-way stretch. A front panel 29 is provided and is attached to the side portions 26 by a zig-zag line of stitching 29'. This front panel preferably has a vertical or one-way stretch. An upper elastic band 30 is provided, and the upper end of the front panel 29 which projects above the side portions 26 is secured to the ends of the band 30 by the lines of stitching 29' and a horizontal line of stitching 31 secures the band to the side portions 26 and back panel 27. The band 30 is formed of elastic fabric having a horizontal or one-way stretch. The band 30 has short vertical stiffening ribs 32 extending transversely thereof. This band 30 having the stiffening ribs and secured to the girdle is disclosed in my prior Patents 2,136,742 and 2,315,701.

At the front and bottom of the girdle, the panel 29 terminates short of the bottom ends of the side portions 26 and the side portions are cut away at 33, providing a relatively large and high front opening 34, which promotes freedom of the use of the legs. The numeral 35 designates diagonal stiffening ribs, secured to the side portions 26 near and upon opposite sides of the main front opening 34. The inclined stiffening ribs 35 extend from the bottom edges of the side portions 26, upon the front of the side portions 26, and the thighs, and the upper ends of these ribs terminate upon the sides of the thighs at or adjacent to the hip joints. These ribs serve to hold the lower portions of the side portions 26 and back panel 27 close to the wearer. The arrangement of the large front opening and the diagonal ribs is substantially the same as that shown in my Patent 2,315,701.

I provide a crotch construction which is designed primarily for use with a girdle having the high main opening at the front, with or without the adjacent stiffening ribs, while not necessarily restricted to this use. This construction comprises a flexible cover or shield 36, which is preferably formed of an elastic fabric having a one-way longitudinal stretch. The cover 36 is elongated and is longitudinally tapered toward its free end or downwardly, and has its upper large end secured to the lower end of the front panel 29 by a horizontal line of stitching 37, the lower end of the front panel terminating substantially at the top of the main opening 34. The tapered cover 36 is preferably disposed upon the front face of the panel 29 although it may be arranged upon the rear face of the same, and although the cover 36 is shown as permanently secured to the panel 29, I contemplate detachably securing the cover 36 to the panel 29 by means of buttons, snap fasteners or the like. While it is preferred that the cover 36 be longitudinally elastic, it may be non-elastic, but it should be flexible, and when elastic, the degree of elasticity may be less than the side portions 26. Permanently secured to the lower or reduced end of the cover 36 by stitching or the like are flexible bands 38, made of elastic fabric having a one-way longitudinal stretch. The bands 38 have a greater degree of elasticity than the body portions 26, and are hence considerably weaker than the side portions 26 when these elements are placed under tension. The free ends of the bands 38 are provided with hooks 39, for detachable engagement within fabric loops 40 secured to the back of the girdle adjacent to the lines of stitching 28. I also contemplate permanently securing the bands 38 to the back of the girdle, and these bands have a high degree of elasticity so that they are relatively weak, and are strong enough to hold the cover 36 in place in use. As shown in Figure 3, the cover 36 and bands 38 extend about the inner sides of the legs and form substantially circles with the side portions 26. The crotch construction therefore forms passages for the legs while affording an ample opening 41 at the rear between the bands 38.

The numeral 42 designates a curtain which may be formed of a light, highly flexible fabric, and this curtain is arranged in advance of the cover 36 and is secured to the panel 29 by the line of stitching 37. The curtain 42 extends downwardly to the elevation of the bottom of the side portions 26 and is free to hang vertical.

In Figure 5ª, the cover 36 is provided with wings 36′, formed integral therewith, and foldable upon lines 37′, and these wings project forwardly and downwardly in use, at substantially right angles to the cover. The same bands 38 are used, and the construction is otherwise identical with Figure 5. I contemplate adding the wings to all of the covers used in connection with the various modifications of the invention.

In Figure 6, I have shown the second modification of the invention wherein a downwardly tapered cover or shield 43, corresponding to the shield 36 is provided, and formed integral with the lower end of the front panel 29 and is a continuation of this front panel. The tapered cover 43 has the same bands 38 secured to its reduced end and these bands extend between the legs and are attached to the back of the girdle at the same points and in the same manner, as described in connection with the first form of the invention. The back of the girdle in the second form of the invention is the same as the back of the girdle in the first form of the invention. I arrange the curtain 42 in front of the cover 43 and this curtain is attached to the front panel 29 by a horizontal line of stitching 44. All other parts of the girdle remain identical with those shown and described in connection with the first form of the invention.

In Figure 8, I have shown a third form of my invention, and in this figure a curtain 45 is formed integral with the lower end of the front panel 29 and is a continuation of this front panel and the lower end of this curtain terminates at the lower ends of the side portions 26. In this third form, the same cover 36 is employed and the upper end of this cover is secured to the lower end of the panel 29 by a horizontal line of stitching 46. The cover 36 is arranged rearwardly of the front panel 29 and has the bands 38 secured to its lower reduced end and these bands are secured to the back of the girdle, in the same manner as shown in Figure 3, and the arrangement of the cover and bands are the same, as shown in Figure 3. All other parts of the girdle are identical with those shown and described in connection with the first form of girdle, Figure 1.

In Figure 10, I have shown a fourth form of the invention. In this figure, the numeral 29ª designates a preferably vertically elastic front panel, corresponding to the panel 29, and secured to the side portions 26 by zig-zag lines of stitching 47. In Figure 10, the front panel 29ª extends downwardly and has its lower end terminating with the lower ends of the side portions 26, and that portion of the front panel extending below the top of the main front opening 34 is slit longitudinally at 48, forming separate depending flaps 49, which serve as a curtain, to a considerable extent, but these flaps are capable of independent movement and the front hose supporters 50 are secured to the lower ends of the flap, while rear hose supporters 51 may be secured to the back of the girdle. The side portions 26 are provided, Figure 10, with triangular extensions 52, and these extensions are disposed behind the panel 29ª, and the lower ends of the lines of stitching 47 converge downwardly to attach the extensions 52 to the panel 29ª.

The same cover 36 is employed and is arranged behind the extensions 52 and the cover 36 is secured to the extensions 52 and front panel by a horizontal line of stitching 53. The same bands 38 are secured to the lower end of the cover 36 and these bands are passed between the legs and attached to the back of the girdle as shown in connection with the first form of the invention, Figures 2 and 3. The flaps 49 serve as the curtain 42, and the cover 36 is used in the same manner as described in connection with the first form of the invention. All other parts of the girdle, Figure 10, remain identical with the first form of the invention, Figure 1.

A fifth form of the invention is shown in Figure 13. In Figure 13, a front panel 29ᵇ is provided, corresponding to the panel 29. The lower end of this front panel 29ᵇ extends down to the bottom of the side portions 26, and this front panel is secured to the side portions by zig-zag lines of stitching 54. The lower end of this front panel serves as a curtain, and the lower end is slit longitudinally at its transverse center, at 55, forming tabs 56, corresponding somewhat to the tabs 49. The front hose supporters 57 are secured to the lower ends of the tabs 56 and the rear hose supporters 58 are secured to the back of the girdle.

The same tapered cover 36 is used, preferably arranged behind the panel 29ᵇ and secured at its top to this panel by a horizontal line of stitching 59. The same bands 38 are secured to the lower end of the cover 36 and these bands are passed between the legs and connected with the back of the girdle, in the manner shown in Figures 2 and 3. All other parts of the girdle remain identical with those shown and described in connection with the first form of the invention. The downward pull of the hose supporters secured to the tabs 56 tend to hold them in the closed position so that they serve as the curtain 42, but since the tabs 56 are separated by the slit, they are free to move with relation to each other, and the advantage of the main opening 34, Figure 1, is produced.

In Figure 15, I have shown a sixth form of the invention. In this figure, the side portions 26 have inwardly projecting extensions 60 at their lower ends which extend inwardly and have free edges 61, arranged in close relation and forming, in effect, a slit. These extensions are therefore separate at the front and produce the advantage of the main front opening 34, Figure 1. The extensions 60 therefore function as the curtain 42. The front hose supporters 62 are secured to the extensions 60, and tend to hold them in the closed position, and since these front hose supporters are carried by the extensions 60 of the side portions 26, the arrangement provides increased elasticity since the side portions have a two-way stretch, and further the arrangement provides less seams and less stitching to reduce bulkiness. The numeral 29ᶜ designates a front panel which is vertically elastic and corresponds to the panel 29. The lower end of this front panel is tapered and terminates at the top of the edges 61, and the panel 29ᶜ is secured to the side portions 26 and extensions 60 by zig-zag lines of stitching 63.

The same cover 36 is used, which is preferably arranged at the rear of the front panel 29ᶜ and the top of the cover 36 is secured to the front panel by a horizontal line of stitching 64. The same bands 38 are secured to the lower end of the cover 36 and are secured to the back of the girdle in the same manner shown in Figures 2 and 3. All other parts of the girdle of Figure 15 remain identical with those shown in Figures 1 and 2.

In Figure 18, I have shown a seventh form of girdle, wherein the side portions 26 are cut away at 65, forming a main opening 66, corresponding to the opening 34, Figure 1. The numeral $29^d$ designates a front panel which is vertically elastic and corresponds to the front panel 29, Figure 6, and is secured to the side portions by zig-zag lines of stitching 67, terminating at the tops of the edges 65. A downwardly tapered cover 68 is formed integral with the front panel $29^d$ and corresponds to the cover 36. The cover 68 has the same straps 38 secured to its lower end and these straps are connected with the back of the girdle as clearly shown in Figures 2 and 3. Front hose supporters 70 are attached to the side portions 26 adjacent to the edges 65 and hose supporters 71 are secured to the back of the girdle. The edges 65 are curved inwardly and are hence closer together at their bottoms, and the down pull on the front hose supporters holds the side portions 26 at their bottom and adjacent to the edges 65 in the proper or inner position so that the ribs 35 may be dispensed with. The opening 66 provides for the freedom of movement of the legs and a curtain 72 may be arranged in advance of the cover 68 and secured to the panel $29^d$ by a line of stitching 73. All other parts of the girdle remain identical with the form shown in Figures 1 to 5 inclusive.

In Figure 19, I have shown an eighth form of girdle wherein a pantie girdle arrangement is provided at the front of the garment, but the crotch is open at the back. In Figure 19, the side portions 26 are connected with a front panel $29^e$, corresponding to the panel 29, and the panel $29^e$ is preferably vertically elastic and its lower end extends substantially to the bottom of the side portions 26. The side portions 26 are provided with sections 74 which are horizontally elastic or vertically and horizontally elastic, and have a greater degree of stretch or elasticity than the side portions 26. The sections 74 are formed separate from the side portions 26 and are secured thereto by zigzag lines of stitching 75. The sections 74 may also be formed of knit fabric, or they may be formed or cut full. The front panel $29^e$ is tapered at its lower end, forming a cover 76, corresponding to the cover 43, and the front panel $29^e$ is secured to the side portions 26 and inserts 74 by zigzag lines of stitching 77. The same elastic bands 38 are secured to the lower ends of the cover 76 and are passed between the legs and carry the hooks 39 for attachment to the back of the girdle, as shown in Figures 2 and 3. The front hose supporters 78 are attached to the sides 26 adjacent to the ribs 36 and the rear hose supporters are secured to the back of the girdle. All other parts remain identical with the first form of girdle.

In Figure $19^a$, I have shown a ninth modification of the girdle. This girdle provides a pantie girdle, having a front crotch portion, without leg portions, while the back of the crotch is open. This girdle comprises the same body portion 25, including side portions 26 having the two-way stretch. The girdle includes a front panel 29′ having a one-way vertical stretch. The side portions 26 are secured to the front panel 29′ by zig-zag lines of stitching $29^a$. The front panel 29′ is provided at its lower ends with a downwardly tapered cover 36′ integral therewith, corresponding to the cover 76, Figure 19. This cover has the longitudinally elastic bands 38 secured to its reduced end which extend to the back of the garment and are attached to the back by hooks and loops, as described in connection with the first form of the invention. These bands may be permanently secured to the back if desired. The bands 38 have a light, easy or lazy long stretch and are much weaker than the side portions 26 and the front panel 29′. The side portions 26 and the front panel are cut or shaped to produce the front crotch portion of the garment which will readily fit to the contour of the body, while the bands 38 simply have enough pull to retain the cover 36′ in place, without inconvenience to the wearer. In this form of the invention, the front ribs 35 are omitted. All other parts of the girdle remain substantially identical with the first form of the girdle shown in Figure 1. Front hose supporters 38′ are secured to the bottom edge of the side portions 26, and 39′ designates rear hose supporters.

In Figures 21 and 22, I have shown a tenth form of girdle embodying my invention. This girdle comprises the side portions 26 which are two-way elastic and a front panel $29^f$, which is one-way vertically elastic or non-elastic. The front panel $29^f$ is secured to the side portions 26 by zigzag lines of stitching 80. The front panel $29^f$ terminates at a point at an elevation above the bottom of the side portions 26. The body-receiving portion is provided with a main front opening 81, to promote the freedom of movement of the legs, and this main opening is vertically long and extends from the bottom of the side portions 26 to the front panel $29^f$. The same ribs 35, Figure 1, are employed and positioned upon the opposite sides of the main opening 81 and serve to hold the lower ends of the side portions 26, at the front, in position, in use. The front hose supporters 82 are secured to the bottom of the side portions 26, adjacent to the ribs 35, and the rear hose supporters 83 are secured to the rear of the body-receiving portion or side portions 26. The main front opening 81 is covered by a fabric section or cover 84, tapering upwardly and corresponding to the shape of the main opening 81, and secured to the side portions and the bottom of the front panel $29^f$ by a zigzag line of stitching 85. This section 84 is made of fabric which is preferably very sheer and has a very weak or lazy stretch. This section may have a one-way horizontal or elastic stretch or a two-way stretch. This curtain is preferably formed of a two-way stretch elastic fabric, although it may be one-way horizontal elastic or stretch. It may be formed of a knitted fabric which will yield horizontally or vertically and horizontally, without rubber in the same. The section 84 may have added fullness which would produce the same result as a horizontal stretch. This section is not intended to perform any control at the front of the garment but simply serves as a cover or protector. It hangs substantially vertical in use. The ribs 35 retain the tension around the sides and back of the garment without depending upon any tension from the section 84. By forming the section 84 of a very weak elastic material, or providing the added fullness therein, and having the side portions of the usual strong elasticity, a new result is obtained, in combination with the ribs 35. I get great leg freedom produced by the main opening 81, just as if the section 84 were not present, and without losing any thigh and back control. In this form of the invention, the cover 36 and bands 38, Figures 1 to 5 inclusive, are omitted. All other parts of the garment remain identical with those shown and described in Figures 1 to 5 inclusive.

In Figure 23, I have shown a further modification of the girdle, wherein a section is provided which forms a front crotch construction. This girdle includes the same side portions 26, having the two-way elastic stretch and a front panel $29^h$, preferably non-elastic. The front panel is preferably non-elastic for controlling the position of the ribs 35, and the upper ends of these ribs are located at the elevation of the hip joints. The girdle is provided with a large high-cut front opening 85′, and this opening is covered by a section 86, which is preferably formed of a light fabric, having a weak or lazy horizontal stretch or horizontal and vertical stretch. This section is secured at its top to the girdle by a line of zigzag stitching 85′. The ends of the section 86 terminate inwardly of and adjacent to the lower ends of the ribs 35. As stated, the section 86 has a weak, light or lazy horizontal stretch so that it may be readily moved inwardly and form a front crotch portion. This section does not function to control the pressure that the girdle exerts upon the body, and hence does not interfere with the freedom of movement of the legs. Instead of forming the section 86 of an elastic fabric containing rubber, it may be a knit fabric, and I also contemplate forming the section of non-elastic fabric and providing the same with a suitable fullness so that it will function like an elastic fabric and may be pulled inwardly to form the front crotch portion. Secured to the section 86 at its bottom and longitudinal center are fabric bands 87′, which are longitudinally elastic and stretch at right angles to the stretch of the section 86. These bands 87′ have a light, lazy and long stretch, and are passed between the legs and secured to the back of the garment, detachably, as illustrated in Figure 1, or permanently, as by sewing. Since the bands 87′ have a long stretch the section and bands may be adjusted, such as pulled forwardly, so that the user may answer a call of nature without removing the garment.

In this form of the invention the ribs 35 function to retain the control of the girdle around the sides and back, while the section 86 serves as a cover and also produces a front crotch construction when the bands 87′ are attached to the rear of the garment, and the back of the crotch construction is open.

As shown in Figure 23, the section 86 has been made of a single section of fabric. In Figure 24, the section is shown as formed in outer sections 88 and an inner section or gore 89, sewed together. This enables the curtain to be shaped or formed into the front crotch portion. The bands 87′ are secured to the inner portion 89, and are secured to the rear of the body portion 25. The front hose supporters 90 are attached to the garment adjacent to the ribs 35 and the rear hose supporters 91 are carried by the back of the garment.

In this form of the invention, the section 86 produces a front crotch portion and the rear of the crotch portion is open.

In the use of the first form of girdle, Figures 1 to 5 inclusive, the bands 38 are passed between the legs and secured to the back of the girdle, and these bands have a slight or weak tension or strength, but are sufficiently strong to hold the cover 36 in the inner or rear position, without inconvenience to the user.

The use of the second form of girdle, Figures 6 and 7, and the third form, Figures 8 and 9, are so similar that further description is thought to be unnecessary.

The use of the next form of the invention, Figures 10 to 12 inclusive, is similar to that described in connection with Figure 1. The flaps 49 serve as a curtain, and since they are separated, permit the freedom of movement of the legs, which is important since the front hose supporters 50 are secured thereto.

The use of the girdle shown in Figures 13 and 14 is similar to that of the girdle of Figure 10. The tabs 56, being separated permit of freedom of movement of the legs and the front hose supporters are carried by the flaps 56.

In Figure 15, the extensions 60 carry the front hose supporters which pull downwardly upon the same and tend to hold them in place, and these extensions being separate provide for the freedom of movement of the legs, and the extensions also serve as a curtain, to a considerable extent.

In Figures 18 and 18*a* the side portions 26, at their bottom extend close to the cover 68, and are separated and cut away at 65, promoting freedom of movement of the legs. The front hose supporters 70 are secured to the sides 26 adjacent to the edges 65, and exert a downward pull which tends to hold these portions of the side portions in place. The curtain 72 is used with the cover 68.

In Figures 19 and 20 the girdle shown produces a crotch construction without the use of the cover 36, Figure 1. The elastic sections 74, having a weaker or higher degree of elasticity, are pulled inwardly between the legs with the cover 76 formed integral with the front panel, and elements 74 and 76 form a closed front portion, while the rear of the crotch is open.

In Figures 19[a] and 20[a], a girdle is shown similar to that shown in Figure 19. In Figure 19[a] the elastic sections 74 are omitted and the side portions 26 extended at their lower ends and secured to the cover 36′. The cover 36′ and the front portions of the side portions 26, at the bottom, are drawn inwardly and rearwardly between the legs, to form a closed front for the crotch construction, and the back of the crotch construction is open. If desired, the strength of the elastic bands 38 may be increased to have substantially the strength of the side portions 26 and the cover 36′.

In Figures 21 and 22, a girdle is shown, comprising a body receiving portion, which includes a lower portion which surrounds the wearer. The lower portion includes the front section 84, sides 26 and back 27. The sides and back are under tension in use, and diagonal lines of tension extend upwardly upon opposite sides of the lower front section 84, and combine with the lines of tension extending around the body at the elevation of the abdomen, to apply the maximum control or compression to the abdomen, where it is needed most. The tension of the side portions 26 decreases downwardly so that the tension is reduced at the bottom of the side portions to eliminate binding action which would interfere with the proper circulation in the legs, and prevent the flesh from bulging at the bottom of the sides. The sides and back are under greater tension than the lower front section 84, which in use will be under only slight tension or substantially free from tension, promoting freedom of movement of the legs.

In Figures 23 and 24, a girdle is shown similar to the girdle of Figure 21. In Figure 23, the bands 87′ are secured to the front section 86, and are passed between the legs and move portions of the front section 86 inwardly between the legs to form a closed front for a crotch construction. The front section 86 is accordingly under some tension, and is movable with the legs.

It is to be understood that the forms of my invention herewith shown and described are to be taken as preferred examples of the same, and that various changes in the shape, size and arrangement of parts, may be resorted to, without departing from the spirit of my invention or the scope of the subjoined claims.

Having thus described my invention, I claim:

1. A girdle, corset or the like garment, comprising a body encircling portion which is at least in part circumferentially elastic and sufficiently strong so that said body encircling portion produces a body control action, said body encircling portion including a front, said front having spaced edge portions at its bottom which are inclined and diverge downwardly, said edge portions extending to the bottom of the body encircling portion, the space between the lower ends of the edge portions extending throughout the major portion of the width of said front, a flexible section disposed at the bottom of said front and being horizontally long and extending throughout the major portion of the width of said front, said flexible section being secured to said front and covering said space and forming a continuation of said front and extending to the bottom of said body encircling portion, said flexible section being horizontally extensible and weak against horizontal pull so that it will not produce body control nor prevent freedom of movement of said legs, the strong tension across said front being transmitted around the inclined edge portions and extending in part to the bottom edge of the body encircling portion upon opposite sides of said space, and approximately vertical elements having their ends secured to the body encircling portion adjacent to its bottom and arranged near and upon opposite sides of said space, said approximately vertical elements holding the lower edge of the body encircling portion against upward movement.

2. A girdle, corset or the like, comprising a body encircling portion which is at least in part circumferentially elastic and sufficiently strong so that said body encircling portion produces a body control action, said body encircling portion including a front, said front having spaced edge portions at its bottom which are inclined and diverge downwardly, said edge portions extending to the bottom of the body encircling portion, the space between the lower ends of the edge portions extending throughout the major portion of the width of said front, a flexible section disposed at the bottom of said front and being horizontally long and extending throughout the major portion of the width of said front, said flexible section being secured to said front and covering said space and forming a continuation of said front and extending to the bottom of said body encircling portion, said flexible section being horizontally extensible and weak against horizontal pull so that it will not produce body control nor prevent freedom of movement of the legs, the strong tension across said front being transmitted around the inclined edge portions and extending in part to the bottom edge of the body encircling portion upon opposite sides of said space, and upstanding stiffening ribs disposed upon opposite sides of said space and having their lower ends arranged adjacent to the bottom edge of the body encircling portion, the strong tension across said front being transmitted to said ribs throughout substanitally the entire length of the ribs.

3. A girdle, corset or the like, comprising a body encircling portion which is at least in part circumferentially elastic and sufficiently strong so that said body encircling portion produces a body control action, said body encircling portion including a front, said front having spaced edge portions at its bottom which are inclined and diverge downwardly, said edge portions extending to the bottom of the body encircling portion, the space between the lower ends of the edge portions extending throughout the major portion of the width of said front, a flexible section disposed at the bottom of said front and being horizontally long and extending throughout the major portion of the width of said front, said flexible section being secured to said front and covering said space and forming a continuation of said front and extending to the bottom of said body encircling portion, said flexible section being horizontally elastic and weak against horizontal pull so that it will not produce body control nor prevent freedom of movement of the legs, the strong tension across said front being transmitted around the inclined edge portions and extending in part to the bottom edge of the body encircling portion upon opposite sides of said space, and upstanding stiffening ribs secured to said body portion and disposed upon opposite sides of said space and having their lower ends arranged near the bottom edge of the body encircling portion, the strong tension across said front being transmitted to said ribs throughout substantially the entire length of the ribs.

4. A girdle, corset or the like, comprising a body encircling portion which is at least in part circumferentially elastic and sufficiently strong so that said body encircling portion produces a body control action, said body encircling portion including a front, said front having spaced edge portions at its bottom which are inclined and diverge downwardly, said edge portions extending to the bottom of the body encircling portion, the space between the lower ends of the edge portions extending throughout the major portion of the width of of said front, a flexible section disposed at the bottom of said front and being horizontally long and extending throughout the major portion of the width of said front, said flexible section being secured to said front and covering said space and forming a continuation of said front and extending to the bottom of said body encircling portion, said section being horizontally elastic and weak against horizontal pull so that it will not produce body control nor prevent freedom of movement of the legs, the strong tension across said front being transmitted around the inclined edge portions and extending in part to the bottom edge of the body encircling portion upon opposite sides of said space, upstanding stiffening ribs secured to the body encircling portion and disposed upon opposite sides of said space and having their lower ends arranged adjacent to the bottom edge of the body encircling portion, the strong tension across said front being transmitted to said ribs throughout substantially the entire length of said ribs, flexible bands secured to said flexible section near its center and adapted to be passed rearwardly between the legs, and means to secure the rear ends of the bands to the back of the body encircling portion, said flexible section and bands being adapted to form a crotch construction.

5. A girdle, corset or the like, comprising a body encircling portion which is at least in part circumferentially elastic and sufficiently strong so that said body encircling portion produces a body control action, said body encircling portion including a front which comprises a downwardly tapered panel which is circumferentially non-elastic, said front being provided at its bottom with a horizontally long main opening which extends throughout the major portion of the width of said front, the lower end of said panel extending to said main opening, said main opening providing said front with inclined edge portions which diverge downwardly, a flexible section disposed at the bottom of said front and being horizontally long and extending throughout the major portion of the width of said front, said flexible section being secured to said front and covering said main opening and forming a continuation of said front and extending to the bottom of said body encircling portion, said flexible section being horizontally elastic and weak against horizontal pull so that it will not produce body control or prevent freedom of movement of the legs, the strong tension across said front being transmitted around the inclined edge portions, and upstanding stiffening ribs secured to the body encircling portion and arranged upon opposite sides of said main opening and having their lower ends arranged near the bottom edge of the body encircling portion, said strong tension across said front being transmitted to the ribs throughout substantially their entire length.

6. A girdle, corset or the like, comprising a body encircling portion which is at least in part circumferentially elastic and sufficiently strong so that said body encircling portion produces a body control action, said body encircling portion including a front which comprises a panel which is circumferentially non-elastic and tapers downwardly substantially to a point, said front being provided at its bottom with a horizontally long main opening which extends throughout the major portion of the width of said front, the lower end of said panel extending substantially to the main opening, said main opening providing said front with inclined edge portions which diverge downwardly, a flexible section disposed at the bottom of said front and being horizontally long and extending throughout the major portion of the width of said front, said flexible section being secured to said front and covering said main opening and forming a continuation of said front and extending to the bottom of said body encircling portion, said flexible section being horizontally yieldable and weak against horizontal pull so that it will not produce body control or prevent freedom of movement of the legs, the strong tension across said front being transmitted around said inclined edge portions, and upstanding stiffening ribs secured to the body encircling portion and arranged upon opposite sides of the main opening.

References Cited in the file of this patent

UNITED STATES PATENTS

| Number | Name | Date |
|---|---|---|
| 1,624,558 | Nickerson | Apr. 12, 1927 |
| 2,107,337 | Moore | Feb. 8, 1938 |
| 2,243,531 | Maclear | May 27, 1941 |
| 2,300,153 | Herbener | Oct. 27, 1942 |
| 2,315,701 | Herbener | Apr. 6, 1943 |
| 2,367,328 | Bercaitz | Jan. 16, 1945 |
| 2,382,477 | Goodman et al. | Aug. 14, 1945 |
| 2,396,599 | O'Brien | Mar. 12, 1946 |
| 2,483,076 | Vacca | Sept. 27, 1949 |
| 2,503,636 | Rockwell | Apr. 11, 1950 |
| 2,522,008 | Wohlman | Sept. 12, 1950 |
| 2,549,361 | Berdach | Apr. 17, 1951 |